L. ZAMBONI.
SKATE ROLLER.
APPLICATION FILED AUG. 19, 1907.
907,100.
Patented Dec. 15, 1908.
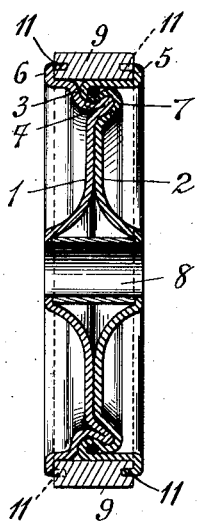
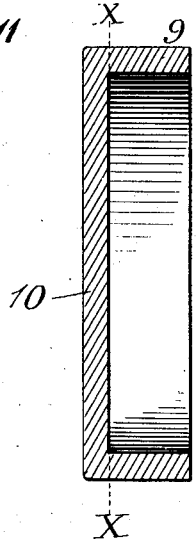
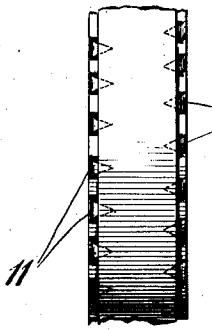
Witnesses:
Edward G. Rowland.
M. F. Keating
Inventor
Lawrence Zamboni
By his Attorney
Charles J. Kintner

UNITED STATES PATENT OFFICE.

LAWRENCE ZAMBONI, OF NEW YORK, N. Y.

SKATE-ROLLER.

No. 907,100.　　　　Specification of Letters Patent.　　　Patented Dec. 15, 1908.

Application filed August 19, 1907. Serial No. 389,186.

*To all whom it may concern:*

Be it known that I, LAWRENCE ZAMBONI, a citizen of the United States, residing in New York, borough of Manhattan, county and State of New York, have made a new and useful Invention in Skate-Rollers, of which the following is a specification.

My invention has for its objects, first, to provide a metallic skate roller having two interlocking parts provided with flanges adapted to firmly secure or hold in place a yielding tire or tread. Second, to provide a skate roller embracing two interlocking metallic parts having flanges and an interlocking ring; together with a yielding tire or tread without a joint or integral throughout its mass. Third, to provide means for more firmly securing a yielding tire or tread on a skate roller than has heretofore been possible.

My invention will be fully understood by referring to the accompanying drawings, in which, Figure 1 represents a cross sectional view of my improved skate roller complete. Fig. 2 illustrates the manner of constructing my yielding tire or tread without a joint, so as to be in effect integral throughout its mass; and Fig. 3 represents a detail view showing my novel manner of holding or securing a leather or analogous tire at numerous points between the side retaining flanges of my skate roller.

Referring first to Fig. 1, 1, 2 represent the opposite halves of a roller or wheel provided with interlocking parts 4, 7 and outer side flanges 5, 6 having holding teeth 11, 11 stamped out and turned inward when the halves are formed; 3 being a split ring of strong steel wire or the like adapted, when in position, to hold the interlocked parts firmly together in the manner shown. 8 represents the hub secured between the central inner faces of the interlocking parts 1 and 2, and 9 represents a tire or tread made preferably of sole leather constructed without a joint and being in effect integral throughout its mass. The interlocking relation of the parts 4 and 7 is such that it is continuous throughout and any pressure put upon the outer surface of the part 7 will tend to more firmly lock or hold the parts together, thus preventing any possibility of the roller collapsing or the parts separating.

In Fig. 2 I have illustrated the preferred manner of making my novel tire or tread without a joint. I prepare with male and female dies a cup having a bottom 10, the side thereof being of the proper internal diameter, and constituting, when formed, the tire or tread 9. This is prepared by forcing a piece of solid fine grained sole leather through the dies under strong pressure, after which the bottom 10 is cut off in any preferred way; or, it may be cut out, if preferred, thus increasing the width of the tire. In fact a tube of considerable length may be constructed in this manner and a number of the tires cut therefrom by placing it on a mandrel and utilizing a lathe and cutting tool.

In assembling the parts the split ring 3 is first placed in position between the curved portions of the outer interlocking part. The tire 9 is then slipped over said interlocking part and the hub 8 is placed, one end in position against the inner face of the part 2. The part 1 is then forced into position with the part 4 inserted into the part 7, thus locking all of said parts securely together and causing the inwardly extending teeth 11, 11 at the outer edges of the flanges 5, 6, to penetrate the lateral or side faces of the tire or tread 9. In this manner I am enabled to securely bind the tire or tread 9 at every point of its circumference directly to the two halves 1 and 2 of the roller, so that there is no possibility of any movement thereof. At the same time, the hub 8 is held in position between the two inner faces of the parts 1 and 2.

I have ascertained that a skate roller when thus constructed possesses great strength and material durability, and the tire or tread, being integral or without a joint, is of such a nature as to have relatively little wearing effect on a rink floor. If preferred, after the tire or tread is in position on the roller the outer face may be accurately turned off.

I make no claim hereinafter to a wheel or roller having interlocking male and female parts in which the outer surface of one of the interlocking parts constitutes a part of the working belt or tread surface of the wheel or roller, such feature constituting in part the subject matter of a prior application filed by me in the U. S. Patent Office on the 6th day of March, 1905, bearing Serial No. 248,523.

Although my invention is specifically designed for use as a skate roller, I do not limit the same for such purpose, as obviously it may be utilized in connection with casters for chairs, beds, sofas, and the like; or for analogous purposes or uses generally.

Having thus described my invention what I claim and desire to secure by Letters Patent of the United States is—

1. A skate roller constructed of two metallic disks having male and female interlocking parts located directly in the rim thereof and provided with side flanges; in combination with a tire or tread held in place by said flanges, substantially as described.

2. A skate roller constructed of two metallic disks provided with interlocking male and female parts located in the rim thereof, each part being provided with a flange having inwardly projecting teeth; in combination with a yielding tire or tread held in place between said teeth, substantially as described.

3. A skate roller constructed of two metallic disks having male and female interlocking parts and side flanges; in combination with a tire or tread held in place by said flanges and a split ring adapted to hold the interlocking parts firmly together, substantially as described.

4. A skate roller constructed of two metallic disks having male and female interlocking parts and side flanges; in combination with a tire or tread held in place by said flanges, a split ring adapted to hold the interlocking parts firmly together, and a hub securely held in place between the inner faces of the disks, substantially as described.

5. A skate roller embracing two pressed metallic disks curved outwardly at or near their centers and provided with interlocking male and female parts which constitute a part of the rim, the outer edges of the rim being provided with side flanges turned inwardly and having teeth; in combination with a yielding tire or tread held in place by said teeth; together with a hub secured between the outward curved central portions of the disks, substantially as described.

In testimony whereof I have signed my name to this specification in the presence of two subscribing witnesses.

LAWRENCE ZAMBONI.

Witnesses:
C. J. KINTNER,
M. F. KEATING.